United States Patent [19]
Moradi-Araghi et al.

[11] Patent Number: 5,789,350
[45] Date of Patent: Aug. 4, 1998

[54] COMPOSITIONS AND PROCESSES FOR TREATING HYDROCARBON-BEARING FORMATIONS

[75] Inventors: Ahmad Moradi-Araghi; Iqbal Ahmed; Karen H. Carney, all of Bartlesville, Okla.

[73] Assignee: Phillips Petroleum Company, Bartlesville, Okla.

[21] Appl. No.: 598,579

[22] Filed: Feb. 12, 1996

[51] Int. Cl.⁶ .................... C09K 7/00; E21B 43/26
[52] U.S. Cl. .................. 507/203; 507/271; 507/267; 507/260; 166/293; 166/294; 166/295
[58] Field of Search ................ 507/203, 271, 507/267, 260; 166/293, 294, 295

[56] References Cited

U.S. PATENT DOCUMENTS

| | | | |
|---|---|---|---|
| 4,110,230 | 8/1978 | Hessert et al. | 507/213 |
| 4,462,017 | 7/1984 | Conway | 507/209 |
| 4,569,393 | 2/1986 | Bruning et al. | 166/270 |
| 4,649,999 | 3/1987 | Sandy et al. | 166/295 |
| 4,657,944 | 4/1987 | Bruning et al. | 523/130 |
| 4,676,930 | 6/1987 | Shu et al. | 252/315.3 |
| 4,799,550 | 1/1989 | Harris et al. | 166/300 |
| 5,082,579 | 1/1992 | Dawson | 507/211 |
| 5,256,315 | 10/1993 | Lockhort et al. | 507/225 |
| 5,478,802 | 12/1995 | Moradi-Araghi | 507/203 |
| 5,547,025 | 8/1996 | Ahmed et al. | 166/295 |
| 5,642,783 | 7/1997 | Moradi-Araghi et al. | 166/295 |

FOREIGN PATENT DOCUMENTS

| | | | |
|---|---|---|---|
| 0136773 | 4/1985 | European Pat. Off. | C08K 5/00 |
| 0604988 | 7/1994 | European Pat. Off. | E21B 33/138 |
| 2299821 | 4/1996 | United Kingdom | E21B 43/25 |

*Primary Examiner*—C. H. Kelly
*Attorney, Agent, or Firm*—Lucas K. Shay

[57] ABSTRACT

A gelling composition comprises a multivalent metal compound-crosslinkable polymer such as a carboxylate-containing polymer, a multivalent metal compound such as a zirconium compound, a liquid, and a pH-lowering agent such as carbon dioxide wherein the composition is prepared by combining the polymer and multivalent metal compound to form a mixture and, thereafter, introducing carbon dioxide to the mixture. A process for treating a subterranean formation can comprise the steps of: (1) combining a polymer with a multivalent compound to form a mixture; (2) introducing the another mixture into a subterranean formation; and (3) introducing carbon dioxide into the mixture.

34 Claims, 2 Drawing Sheets

COMPOSITIONS AND PROCESSES FOR TREATING HYDROCARBON-BEARING FORMATIONS

FIELD OF THE INVENTION

The present invention relates to a composition and a process which are useful, for example, for altering permeability and correcting water coning problems of hydrocarbon-bearing subterranean formations.

BACKGROUND OF THE INVENTION

It is well known to those skilled in the art that gelled or crosslinked water-soluble polymers are useful in enhanced oil recovery and other oil field operations. They have been used to alter the permeability of underground formations in order to enhance the effectiveness of water flooding operations. Generally, polymers along with an appropriate crosslinking system are injected in an aqueous solution into the formation. The polymers then permeate into and gel in the regions having the highest water permeability.

Because of environmental concerns as well as cost for disposing of a produced brine which is defined as the brine co-produced with oil or gas and is often contaminated with oil or gas, or both, it may be desirable to utilize the produced brine as the aqueous solution used for the polymers and appropriate crosslinking systems. Use of produced brines eliminates not only the cost associated with acquiring and pre-treating fresh water for use as the aqueous solution but also the disposal cost for the produced brine. Most produced brines are known to be hard brines, i.e., those having a divalent cation concentration greater than 1000 ppm.

Although a chromium(III) salt which is not as toxic as a chromium(VI) salt can be used as crosslinking agent, it is not an environmentally desirable compound and its use may require additional costs to assure the integrity of the injection wells to avoid contamination of ground water sources. Other multivalent metallic compounds such as compounds of zirconium, titanium, ferric or ferrous, aluminum, or combinations of any two or more thereof have been used to produce gels with synthetic water-soluble polymers or natural polymers for various oil-field operations such as, for example, water shut-off and permeability corrections for reservoirs. Usually these metallic ions crosslink gellable polymers through the interaction with the carboxylate groups of the polymer molecules. Generally, the gellable polymers used such as, for example, polyacrylamide are of high molecular weight and contain high degrees of hydrolysis, i.e., contain 10–30 mole % carboxylate groups. However, these high molecular weight and/or high mole % carboxylate group-containing polymers gel almost instantly in the presence of the above-described multivalent metallic compounds. Such fast gelation rate renders the application of gelling compositions containing these polymers and multivalent metallic compounds not useful in many oil-field applications such as, for example, water shut-offs and permeability reductions. Furthermore, the resulting gels typically synerese heavily in most oil-field brines Many processes have been developed to delay the gelation of gelling compositions by adding a gelation delaying agent to the gelling compositions. However, a gelation delaying agent is not inexpensive and a gelation delaying agent often adds appreciable costs to oil field operation.

Therefore, a more environmentally suitable process using a gelling composition that can form stable gels in a liquid such as, for example, produced brines for near-wellbore as well as in-depth treatments and that does not require a gelation delaying agent is highly desirable.

SUMMARY OF THE INVENTION

An object of the invention is to provide a composition and a process useful for altering the permeability of hydrocarbon-bearing formations. Another object of the invention is to provide a composition and a process for altering the permeability of hydrocarbon-bearing formations by using a gelling composition that is environmentally suitable for use in oil-field operations. A further object of the invention is to provide a composition and a process for altering the permeability of hydrocarbon-bearing formation wherein the composition does not require a gelation delaying agent. Still another object of the invention is to provide a process for wellbore treatment employing a gelling composition that is environmentally suitable for oil-field operations. An advantage of the invention is the invention process does not employ a gelation delaying agent, yet achieves the alteration of permeability of the formations or other oil-field applications. Another advantage of the invention is that generally the gelation of the composition can be accelerated by the addition of a pH-lowering agent. Other objects, features, and advantages will become more apparent as the invention is more fully disclosed hereinbelow.

According to a first embodiment of the present invention, a composition which can be used for enhancing hydrocarbon recovery is provided. The composition comprises a water-soluble polymer, a crosslinking agent, and a liquid and does not contain a gelation delaying agent.

According to a second embodiment of the present invention, a process for treating hydrocarbon-bearing formation is provided which comprises injecting into the formation a gelling composition which comprises a water-soluble polymer, a crosslinking agent, and a liquid wherein the gelling composition forms gels when injected into the formation.

DETAILED DESCRIPTION OF THE INVENTION

Figure 1:
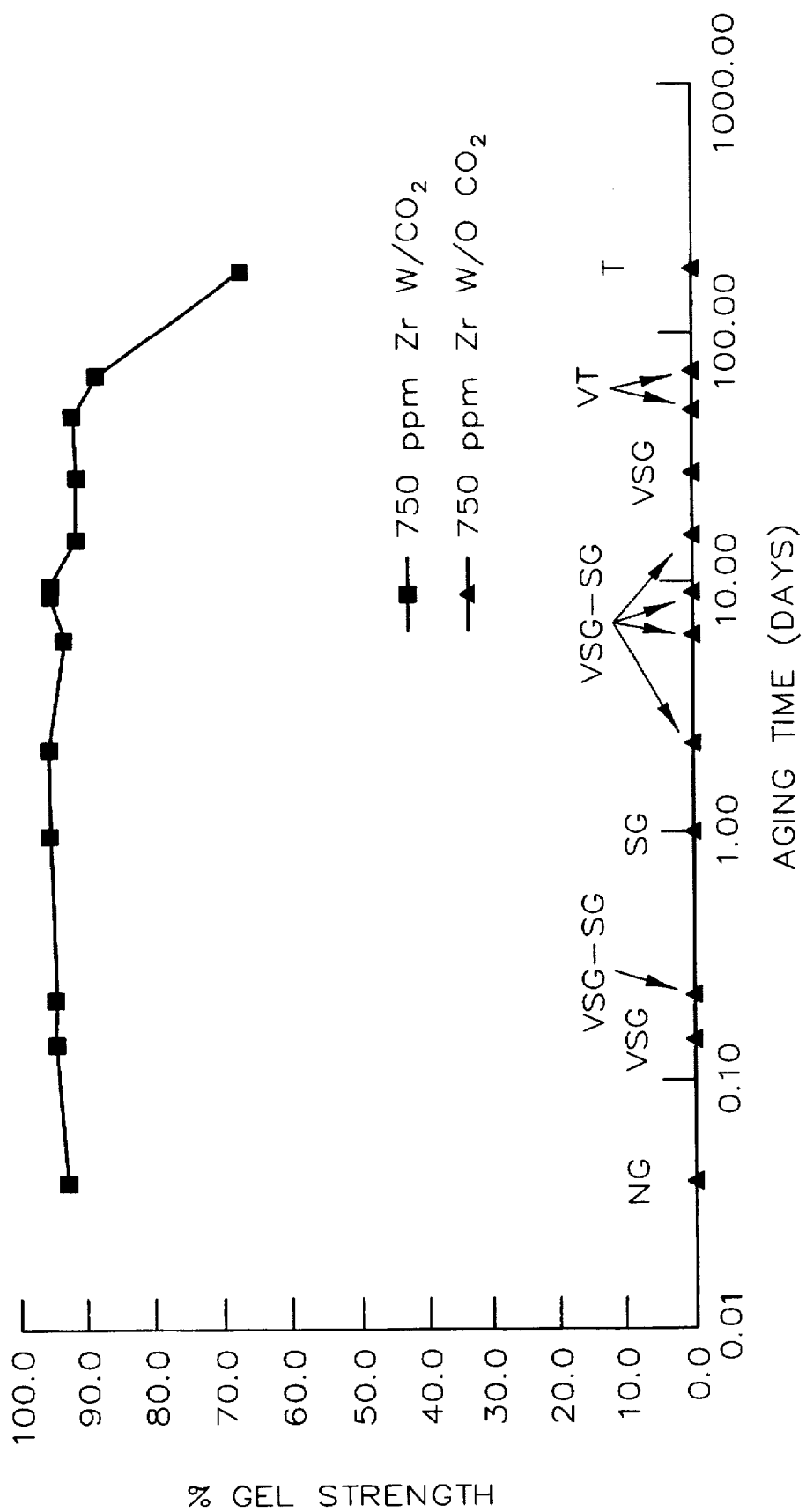
FIG. 1 is a graphic representation of gel strength of gels formed as a function of aging time at 120° F. in 2% KCl solution in the presence (■) or absence (▲) of carbon dioxide.

According to the first embodiment of the present invention, a composition is provided which can be used for treating a hydrocarbon-bearing formation and comprises, or consists essentially of, or consists of, a water-soluble polymer, a crosslinking agent, and a liquid. Generally the water soluble polymer contains a functional group such as carboxylate group that is crosslinkable with a metal cation and is present in an aqueous solution containing a liquid. Most frequently used water-soluble polymers are carboxylate-containing polymers. The term "liquid" used herein is interchangeable with "water" and generically refers to, unless otherwise indicated, pure water, regular tap water, a solution or suspension wherein the solution or suspension contain a variety of salts. A typical solution is a produced brine. The term "hydrocarbon" denotes any hydrocarbons which may or may not be oxygenated or substituted with appropriate substituents. The hydrocarbon may also contain minor components such as, for example, sulfur. The presently preferred hydrocarbons are crude oil and natural gas. The treatment includes, but is not limited to, permeability alteration, water coning correction, water shutoff, gas shutoff, and zone abandonment.

The produced brine is defined as the brine co-produced with oil or natural gas, or both, which generally is a hard brine, i.e., containing at least 1,000 ppm of $Ca^{+2}$, $Ba^{+2}$, $Mg^{+2}$, or $Sr^{+2}$, or, combinations thereof. A produced brine generally contains high salinity of from about 1 weight % to about 30% total dissolved solids. A produced brine generally is contaminated with oil or natural gas, or both. The gellable polymer generally gels well in produced brines having a salinity of from about 0.3% to about 25%.

The term "carboxylate-containing polymer" used herein refers to, unless otherwise indicated, a polymer that contains at least one free carboxylic group or a carboxylate group in which the proton of the carboxylic acid is substituted with an ammonium radical, an alkali metal, an alkaline earth metal, or combinations of any two or more thereof.

According to the present invention, the term "delaying agent" denotes a chemical or mixture of chemicals which delays the rate of gelation. A delaying agent useful for the retardation of the rate of gelation is generally a carboxylic acid and salts thereof which can contain one or more hydroxyl groups. A commonly known delaying agent can also be an amine that has more than one functional group and contains one or more hydroxyl groups and that can chelate the zirconium or titanium moiety of the zirconium or titanium compounds described above. The term "delaying agent" can be interchangeable with "chelating agent", or "sequestering agent", or "gelation retarding agent".

According to the present invention, the molecular weight of the water-soluble polymers is generally at least about 10,000 and less than about 25,000,000, preferably less than about 20,000,000. The mole percent % of the carboxylate group in carboxylate-containing polymers is generally in the range of from about 0.01 to less than about 45, preferably about 0.1 to less than about 25, more preferably about 0.1 to less than about 15, even more preferably about 0.1 less than about 10, and most preferably 0.2 to 10 mole %.

According to the present invention, the gelation rate is defined as the rate at which gel particles are formed. At the onset of gelation these particles are small enough that the gelling solution still flows, but these particles can be detected from apparent flow characterization caused by the apparent viscosity change. The small particles grow to larger granules with time and become strong enough to hold fluids within their structures which restrict the free flowing characterizing of the gelling solution and thus, develop tongue length. The gelation rate is generally longer than about 1 hour, preferably longer than about 2 hours, more preferably longer than about 3 hours, even more preferably longer than about 4 hours, and most preferably longer than 10 hours. Generally, no appreciable gel strength, as defined in Example I, is observed until a tongue length can be measured.

Carboxylate-containing polymers suitable for use in this invention are those capable of gelling in the presence of a crosslinking agent such as, for example, a multivalent metallic compound. Polymers suitable for use in this invention, i.e., those capable of gelling in the presence of a crosslinking agent, include, but are not limited to, biopolysaccharides, cellulose ethers, and acrylamide-containing polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and carboxymethyl cellulose (CMC) for their ready availability.

Suitable biopolysaccharides are disclosed in U.S. Pat. No. 4,068,714 (herein incorporated by reference). Particularly preferred is polysaccharide B-1459 and xanthan gums which are biopolysaccharides produced by the action of *Xanthomonas campestris* bacteria. This biopolysaccharide is commercially available in various grades under the tradename "KELZAN®" (Kelco Company, San Diego, Calif.) and "FLOCON" 4800 (Pfizer, Groton, Conn.) and they are readily available.

Suitable acrylamide-containing polymers which also contain pendant carboxylate groups are disclosed in U.S. Pat. No. 3,749,172 (herein incorporated by reference). Particularly preferred are the so-called partially hydrolyzed polyacrylamides possessing pendant carboxylate groups through which crosslinking can take place. Thermally stable carboxylate-containing polymers of acrylamide, such as polyacrylamides; copolymers of N-vinyl-2-pyrrolidone and acrylamide; terpolymers of sodium-2-acrylamido-2-methylpropanesulfonate, acrylamide and N-vinyl-2-pyrrolidone; and copolymers of sodium-2-acrylamido-2-methylpropanesulfonate and acrylamide; and combinations of any two or more thereof, are particularly preferred for applications in high salinity environments at elevated temperatures for stability. Selected carboxylate-containing terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and other polymers containing acrylate groups.

Other miscellaneous polymers suitable for use in, the present invention include partially hydrolyzed polyacrylonitriles, copolymers of acrylate and styrene sulfonate, or combinations of any two or more thereof.

The presently preferred carboxylate-containing polymers are CMHEC, CMC, xanthan gum, and the acrylamide-containing polymers, particularly the partially hydrolyzed polyacrylamides, polymers containing acrylamide, ammonium or alkali metal salts of acrylic acid, and polymers containing ammonium or alkali metal salts of acrylic acid, N-vinyl-2-pyrrolidone, and sodium-2-acrylamido-2-methylpropanesulfonate. The ammonium or alkali metal salts of acrylic acid are herein referred to as acrylate, as in the claims.

Any crosslinking agents such as, for example, a multivalent metallic compound that are substantially soluble in the liquid component of the composition and are capable of crosslinking the gellable carboxylate-containing polymer in the hydrocarbon-bearing formations can be used in the process of the present invention. The presently preferred multivalent metallic compound is a metal compound selected from the group consisting of zirconium compounds, titanium compounds, aluminum compounds, iron compounds, chromium compounds, and combinations of any two or more thereof. Examples of suitable multivalent metallic compounds include, but are not limited to, ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine) zirconate, zirconium carbonate, zirconyl ammonium carbonate, ammonium titanium carbonate, titanium chloride, titanium carbonate, ammonium titanium chloride, and combinations of any two or more thereof. These compounds are commercially available. The presently most preferred crosslinking agent is ammonium zirconium carbonate.

The pH-lowering agent can be any chemicals that lower the pH of the invention compositions to a pH or a range of pH that is suitable for gelation of the composition. Examples of suitable pH-lowering agent include, but are not limited to carbon dioxide; or a carbon dioxide-generating compound; a weak acid such as carbonic acid, formic acid, acetic acid, propionic acid, butyric acid, and phosphoric acid; esters such as ethyl formate, ethyl acetate, methyl formate, and amyl acetate; a mineral acid; and combinations of any two or more thereof. The presently preferred pH-lowering agent is carbon dioxide for it is readily available, inexpensive, and relatively easy and safe to handle.

While the invention is not bound by theory, it is believed that the pH-lowering agent lowers the pH of the composition such that the crosslinking metal compound is dissociated to provide cations available for crosslinking.

The concentration or amount of the water-soluble polymer in the gelling composition can range widely and be as suitable and convenient for the various polymers, and for the degree of gelation needed for particular reservoirs. Generally, the concentration of polymer in an aqueous solution is made up to a convenient strength of about 100 to 100,000 mg/l (ppm), preferably about 200 to 70,000 ppm, and most preferably 500 to 50,000 ppm.

The concentration of crosslinking agent used in the present invention depends largely on the concentrations of polymer in the composition. Lower concentrations of polymer, e.g., require lower concentrations of the crosslinking agent. Further, it has been found that for a given concentration of polymer, increasing the concentration of crosslinking agent generally substantially increases the rate of gelation. The concentration of crosslinking agent in the injected slug varies generally over the broad range of about 1 mg/l (ppm) to about 5,000 ppm, preferably over the range of about 1 ppm to about 3,000 ppm, and most preferably 1 ppm to 2,000 ppm.

According to the present invention, the quantity of the pH-lowering agent required can be any quantity that can lower the pH of the composition so that the gelation can be accelerated. Generally the quantity required depends on the type of crosslinking agent as well as water-soluble polymer used in the composition, on the pH-lowering agent employed, and on the gelation rate desired. The quantity can be in the range of from about 1 ppm to about 100,000 ppm, preferably about 1 ppm to about 50,000 ppm, and most preferably about 1 ppm to about 20,000 ppm.

The liquid component generally makes up the rest of the composition.

The composition of the invention, though not necessary, can also contain a complexing ligand such as a salt of a carboxylic acid. The concentration of the complexing ligand, if present, in the composition also depends on the concentrations of the water-soluble polymer in the composition and on the desired rate of gelation. Generally, the lower the concentration of the complexing ligand is, the faster the gelation rate is.

Any suitable procedures for preparing the aqueous admixtures of the water-soluble polymers, crosslinking agents, and liquid can be used. Some of the polymers can require particular mixing conditions, such as slow addition of finely powdered polymer into a vortex of stirred brine, alcohol prewetting, protection from air (oxygen), preparation of stock solutions from fresh rather than salt water, as is known for such polymers.

Generally, a water-soluble polymer is mixed with a crosslinking agent, both in a suitable liquid. The pH-lowering agent is then added to the mixture of the polymer and crosslinking agent. The timing of adding the pH-lowering agent depends on the desired gelation time.

For example, the water-soluble polymer can be first combined with a crosslinking agent, both in a liquid, to form a mixture. A pH-lowering agent is then introduced to the mixture to form a second mixture. The second mixture can then be used to form gels in a subterranean formation.

The use of gelled polymers to alter the water permeability of underground formations is well known to those skilled in the art. Generally, an aqueous solution containing the polymer and a crosslinking agent is pumped into the formation so that the solution can enter into the more water swept portions of the formation and alter water permeability by gelling therein.

According to the second embodiment of the present invention, a process is provided in which an aqueous composition comprising a crosslinking agent and a water-soluble polymer is prepared and thereafter injected into an injection or production well. The water-soluble polymer and crosslinking agent, both in a suitable liquid, can also be simultaneously injected or sequentially injected in any order. The definition and scope of the crosslinking agent and polymer are the same as those described above. The amount of the aqueous gelling composition injected can vary widely depending on the treatment volume injected. The amount of the gellable polymer injected is also dependent on the gel strength desired, same as that described for the crosslinking agent.

The pH-lowering agent can be added to the aqueous composition comprising a crosslinking agent and a water-soluble polymer just before the composition is injected. The pH-lowering agent can also be separately injected, either before or after the injection of the composition. Alternatively, each component of the aqueous composition in a liquid can be sequentially injected, in any order.

The nature of the underground formation treated is not critical to the practice of the present invention. The described gelling composition can be injected into a formation having a temperature range of from about 70° F. to about 300° F. when the polymer used is a gelling copolymer suitable for the brine used at the reservoir temperature or temperatures in the range of from about 70° F. to about 300° F. for partially hydrolyzed polyacrylamide, xanthan gum, CMC, or CMHEC, preferably about 80° F. to about 180° F., and most preferably 80° F. to 170° F. for best results. Any means known to one skilled in the art can be used for injecting the gelling composition.

Examples provided hereinbelow are intended to assist one skilled in the art to further understand the invention and should not be considered limitative.

EXAMPLE I

The purpose of this example is to illustrate the gelation of a composition comprising a water-soluble polymer, a crosslinking agent, and a brine, and to use this example as a control.

Polyacrylamide solutions (0.5 weight %) were prepared by mixing sufficient amount of the polymer in a synthetic brine having 2% KCl. Then 20 ml samples of each polymer solution were placed in two vials. Each vial was then charged with ammonium zirconium carbonate to a final concentration of 750 ppm (mg/l) measured as Zr ion. The vials were placed upright in test tube racks and then placed in ovens heated to and held at 120° F. Periodically, the ampules were removed from the oven and the mechanical strength of the gels was determined.

As crosslinking developed, small microgels of granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each vial horizontally allowing the gelling composition to flow to its equilibrium position and then measuring the length of the tongue formed. As gelation progressed with time, stronger gels and shorter tongue lengths were developed. The gel strength is expressed mathematically as Percent Gel Strength=$(AL-TL)\times 100/AL$ where AL equals ampule length (in centimeters), typically 22.5 cm, and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0.

EXAMPLE II

Figure 2:
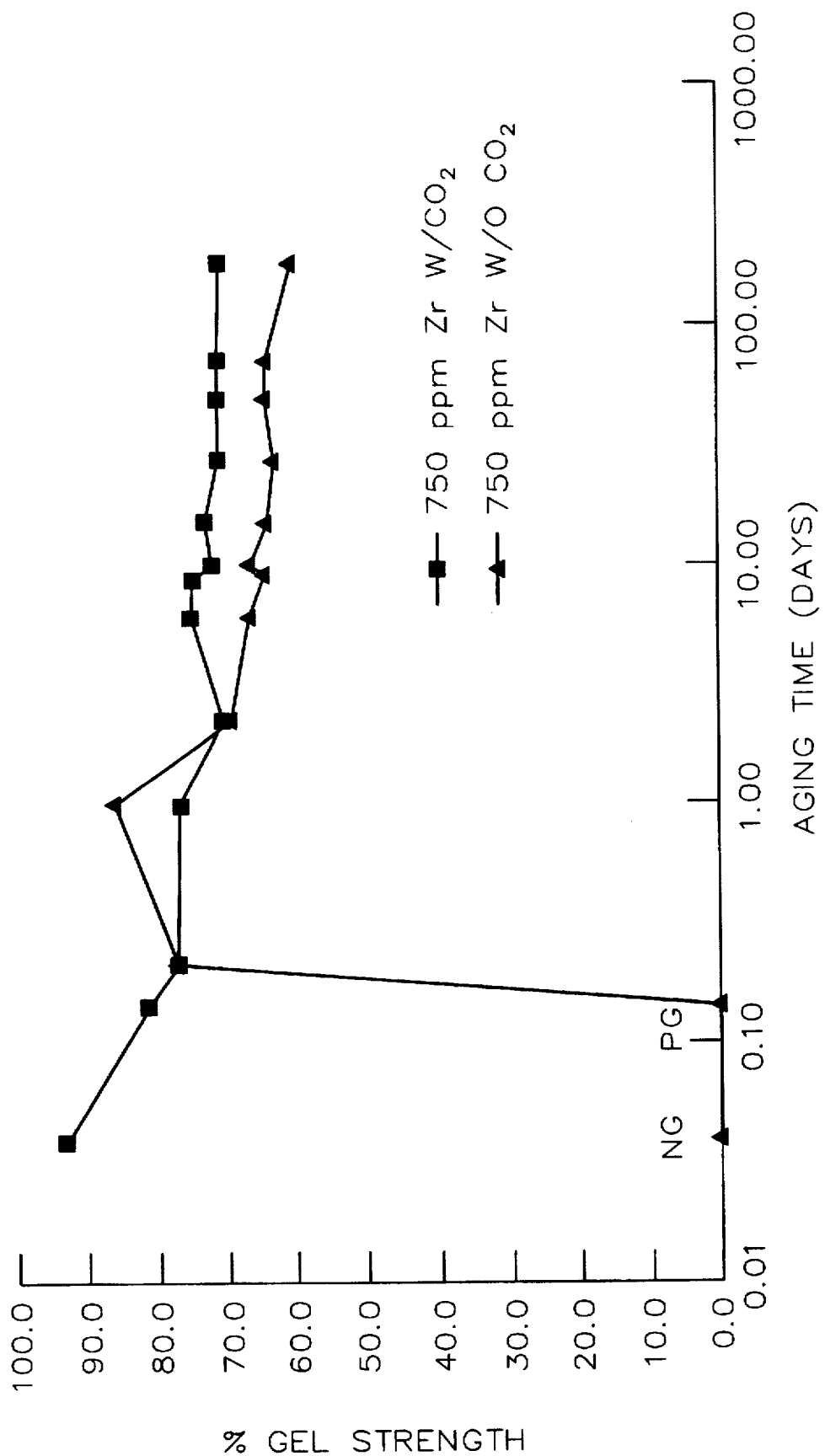
FIG. 2 is the same as FIG. 1 except that distilled water was used in place of 2% KCl. The concentration of the copolymer was 5,000 mg/l (ppm) and that of the crosslinking agent, ammonium zirconium carbonate measured as zirconium cation, was 750 ppm. See Example II for detail.

This example illustrates the gelation of the compositions of the present invention. The abbreviations used in FIG. 1 and FIG. 2 are: NG, no gel; VSG, very slight gel; SG, slight gel; T, thick (solution); VT, very thick (solution); and PG, partial gel.

The runs were carried out using the procedure described in Example I. The data on the gelation of polyacrylamides with 750 ppm of ammonium zirconium carbonate in presence and absence of $CO_2$ is presented in FIG. 1 which shows that a solution of 5000 ppm "OFXC-1163" polyacrylamides (commercially available from American Cyanamide, about 8% hydrolysis and 14,000,000-18,000,000 molecular weight) in 2% KCl did not produce a measurable gel with ammonium zirconium carbonate in the absence of $CO_2$ even after six months of aging at 120° F. This mixture only produced a slight gel (SG) after about one day of aging and the resulting gel gradually deteriorated with additional aging to a thick (T) solution. However, the same solution produced a gel within seconds of exposure to 30 cm$^3$ of $CO_2$. The resulting gels which lost about 25% of its strength in six months of aging could be suitable for near-well treatments. The mechanism by which the gelation occurs was probably due to the pH change in presence of $CO_2$ which made the zirconium cation available for crosslinking in this brine.

FIG. 2 shows the gelation results for a similar mixture as described above for FIG. 1 except that the solvent used was distilled water instead of 2% KCl solution. In the absence of $CO_2$, no measurable gel was produced till after 3.5 hours of aging at 120° F. This was a sufficient period of time to inject the gelling mixture in its target zone before the injection of $CO_2$ and immediate gel formation. The results of the two waters in the absence of $CO_2$, indicate that the rate of gelation decreased substantially with salinity of the water used. Wishing not to be bound by theory, this might be due to the lower solubility of ammonium zirconium carbonate in the presence of dissolved salts. It should be noted that the use of distilled water as a solvent for gel treatments of wells is highly unlikely and the tests were only performed to evaluate the limits of this invention.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising effective ratios of: (1) a carboxylate-containing polymer, (2) a multivalent metal compound which comprises a cation and an anion wherein the cation is selected from the group consisting of zirconium, titanium, and combinations thereof, and the anion is selected from the group consisting of fluoride, carbonate, chloride, citrate, amine, and combinations of any two or more thereof, (3) a liquid selected from the group consisting of pure water, tap water, solutions or suspension of salts, and combinations of any two or more thereof, and (4) a pH-lowering agent selected from the group consisting of carbon dioxide, carbon dioxide-generating compounds, weak acids, esters, and combinations of any two or more thereof wherein said composition does not contain a gelation delaying agent and said ratio is effective to form a gel from said composition.

2. A composition according to claim 1 wherein said pH-lowering agent is selected from the group consisting of carbon dioxide, carbonic acid, formic acid, acetic acid, propionic acid, butyric acid, phosphoric acid, ethyl formate, ethyl acetate, methyl formate, amyl acetate, and combinations of any two or more thereof.

3. A composition according to claim 1 wherein said pH-lowering agent is carbon dioxide.

4. A composition according to claim 1 wherein said polymer is selected from the group consisting of biopolysaccharides, cellulose ethers, acrylamide-based polymers, acrylonitrile-based polymers, sulfonate-based polymers, and combinations of any two or more thereof.

5. A composition according to claim 1 wherein said polymer is an acrylamide-based polymer containing carboxylate groups.

6. A composition according to claim 5 wherein said polymer is a polyacrylamide.

7. A composition according to claim 1 wherein said multivalent metal compound is selected from the group consisting of ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine)zirconate, zirconium carbonate, zirconyl ammonium carbonate, ammonium titanium carbonate, titanium chloride, titanium carbonate, ammonium titanium chloride, and combinations of any two or more thereof.

8. A composition according to claim 1 wherein said multivalent metal compound is an inorganic zirconium compound.

9. A composition according to claim 1 wherein said multivalent metal compound is ammonium zirconium carbonate.

10. A composition according to claim 1 wherein said liquid is a solution containing 2 weight % KCl.

11. A composition according to claim 1 wherein said composition is prepared by combining the components comprising said polymer, said multivalent metal compound, said liquid, and said pH-lowering agent.

12. A composition comprising effective ratios of: (1) a water-soluble polymer, (2) a multivalent metal compound, (3) a liquid, and (4) a pH-lowering gent selected from the group consisting of carbon dioxide, carbon dioxide-generating compounds, weak acids, esters, and combinations of any two or more thereof wherein:

said composition does not contain a gelation delaying agent and said ratio is effective to form a gel from said composition;

said polymer is selected from the group consisting of biopolysaccharides, cellulose ethers, acrylamide-based polymers, acrylonitrile-based polymers, sulfonate-based polymers, and combinations of any two or more thereof wherein said polymer comprises at least a functional group that can be crosslinked with a zirconium cation;

said multivalent metal compound is selected from the group consisting of ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine)zirconate, zirconium carbonate, zirconyl ammonium carbonate, ammonium titanium carbonate, titanium chloride, titanium carbonate, ammonium titanium chloride, and combinations of any two or more thereof; and said liquid is selected from the group consisting of water, solutions, suspensions, and combinations of any two or more thereof.

13. A composition according to claim 12 wherein said polymer is a partially hydrolyzed polyacrylamide, said multivalent metal compound is a zirconium compound or combinations of zirconium compounds, and said liquid is a solution containing 2 weight % KCl.

14. A composition according to claim 12 wherein said multivalent metal compound is ammonium zirconium carbonate.

15. A composition according to claim 13 wherein said multivalent metal compound is ammonium zirconium carbonate.

16. A composition according to claim 12 wherein said pH-lowering agent is selected from the group consisting of carbon dioxide, carbonic acid, formic acid, acetic acid, propionic acid, butyric acid, phosphonic acid, ethyl formate, ethyl acetate, methyl formate, amyl acetate, and combinations of any two or more thereof.

17. A composition according to claim 12 wherein said pH-lowering agent is carbon dioxide.

18. A composition according to claim 15 wherein said pH-lowering agent is carbon dioxide.

19. A composition comprising a partially hydrolyzed polyacrylamide, ammonium zirconium carbonate, a liquid, and carbon dioxide wherein said polyacrylamide is present in the range of from 500 to 50,000 ppm of said composition, said ammonium zirconium carbonate is present in the range of from 1 to 2,000 ppm of said composition, and said carbon dioxide is present in the range of from 1 to 20,000 ppm of said composition.

20. A process comprising the steps of injecting into a subterranean formation a composition which comprises effective ratios of: (1) a carboxylate-containing polymer, (2) a multivalent metal compound which comprises a cation and an anion wherein the cation is selected from the group consisting of zirconium, titanium, and combinations thereof, and the anion is selected from the group consisting of fluoride, carbonate, chloride, citrate, amine, and combinations of any two or more thereof, (3) a liquid selected from the group consisting of pure water, tap water, solutions or suspension of salts, and combinations of any two or more thereof, and (b) injecting into aid subterranean formation a pH-lowering agent selected from the group consisting of carbon dioxide, carbon dioxide-generating compounds, weak acids, esters and combinations of any two or more thereof wherein said composition does not contain a gelation delaying agent and said ratio is effective to form a gel from said composition.

21. A process according to claim 20 wherein said pH-lowering agent is selected from the group consisting of carbon dioxide, carbonic acid, formic acid, acetic acid, propionic acid, butyric acid, phosphonic acid, ethyl formate, ethyl acetate, methyl formate, amyl acetate, and combinations of any two or more thereof.

22. A process according to claim 20 wherein said pH-lowering agent is carbon dioxide.

23. A process according to claim 20 wherein said polymer is selected from the group consisting of biopolysaccharides, cellulose ethers, acrylamide-based polymers, acrylonitrile-based polymers, sulfonate-based polymers, and combinations of any two or more thereof.

24. A process according to claim 20 wherein said polymer is an acrylamide-based polymer containing carboxylate groups.

25. A process according to claim 24 wherein said polymer is a polyacrylamide.

26. A process according to claim 20 wherein said multivalent metal compound is selected from the group consisting of zirconium compounds, titanium compounds, and combinations of any two or more thereof.

27. A process according to claim 20 wherein said multivalent metal compound is selected from the group consisting of ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine)zirconate, zirconium carbonate, zirconyl ammonium carbonate, ammonium titanium carbonate, titanium chloride, titanium carbonate, ammonium titanium chloride, and combinations of any two or more thereof.

28. A process according to claim 20 wherein said multivalent metal compound is an inorganic zirconium compound.

29. A process according to claim 20 wherein said multivalent metal compound is ammonium zirconium carbonate.

30. A process according to claim 20 wherein said liquid is selected from the group consisting of water, solutions, suspensions, and combinations of any two or more thereof.

31. A process according to claim 20 wherein said liquid is a solution containing 2 weight % KCl.

32. A process according to claim 20 wherein said composition is prepared by combining the components comprising said polymer, said multivalent metal compound, and said liquid.

33. A process comprising the steps of: (A) injecting into a subterranean formation a composition which comprises effective ratios of: (1) a water-soluble polymer, (2) a zirconium compound, and (3) a liquid; and thereafter (B) injecting to said formation a pH-lowering agent selected from the group consisting of carbon dioxide, carbon dioxide-generating compounds, weak acids, esters, and combinations of any two or more thereof wherein:

said composition does not contain a gelation delaying agent and said ratio is effective to form a gel from said composition;

said polymer is selected from the group consisting of biopolysaccharides, cellulose ethers, acrylamide-based polymers, acrylonitrile-based polymers, sulfonate-based polymers, and combinations of any two or more thereof wherein said polymer comprises at least a functional group that can be crosslinked with a zirconium cation;

said multivalent metal compound is selected from the group consisting of ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine)zirconate, zirconium carbonate, zirconyl ammonium carbonate, ammonium titanium carbonate, titanium chloride, titanium carbonate, ammonium titanium chloride, and combinations of any two or more thereof; and said liquid is selected from the group consisting of water, solutions, suspensions, and combinations of any two or more thereof.

34. A process according to claim 33 wherein said polymer is a partially hydrolyzed polyacrylamide, multivalent metal compound is ammonium zirconium carbonate, and said pH-lowering agent is carbon dioxide.

* * * * *